(12) United States Patent
Hiraide (10) Patent No.: US 10,534,398 B2
(45) Date of Patent: Jan. 14, 2020

(54) ELECTRONIC DEVICE AND WEARABLE DEVICE

(71) Applicant: SEIKO EPSON CORPORATION, Tokyo (JP)

(72) Inventor: Noriaki Hiraide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 15/991,450

(22) Filed: May 29, 2018

(65) Prior Publication Data

US 2018/0348822 A1   Dec. 6, 2018

(30) Foreign Application Priority Data

Jun. 6, 2017   (JP) .................................. 2017-111317

(51) Int. Cl.
  *G06F 1/16*   (2006.01)
  *G06F 3/044*   (2006.01)
(52) U.S. Cl.
  CPC ............ *G06F 1/1643* (2013.01); *G06F 1/163* (2013.01); *G06F 3/044* (2013.01)
(58) Field of Classification Search
  CPC ......... G06F 1/1643; G06F 1/163; G06F 3/044
  See application file for complete search history.

(56) References Cited

U.S. PATENT DOCUMENTS

| 7,490,979 | B2* | 2/2009 | Hiranuma | G04B 19/286 |
| | | | | 368/295 |
| 7,778,118 | B2 | 8/2010 | Lyons et al. | |
| 9,256,208 | B2* | 2/2016 | Hiranuma | G04B 19/283 |
| 10,019,097 | B2* | 7/2018 | Ely | G06F 3/0414 |
| 2006/0139320 | A1* | 6/2006 | Lang | G06F 1/163 |
| | | | | 345/156 |
| 2007/0211042 | A1* | 9/2007 | Kim | G04C 3/005 |
| | | | | 345/184 |
| 2009/0059730 | A1 | 3/2009 | Lyons et al. | |
| 2015/0085627 | A1* | 3/2015 | Hiranuma | G04B 19/283 |
| | | | | 368/295 |
| 2017/0248986 | A1* | 8/2017 | Jackson | G06F 3/016 |
| 2018/0018026 | A1* | 1/2018 | Bushnell | G06F 3/0338 |
| 2018/0088724 | A1* | 3/2018 | Erentok | G04G 21/08 |
| 2018/0173279 | A1* | 6/2018 | Park | G06F 1/163 |
| 2018/0307333 | A1* | 10/2018 | Lim | G06F 3/041 |

* cited by examiner

*Primary Examiner* — James Wu
*Assistant Examiner* — Hung Q Dang
(74) *Attorney, Agent, or Firm* — Oliff PLC (57) ABSTRACT

An electronic device includes: an electrostatic capacitance-type touch panel; an electrically conductive movable part; and an electrical conductor which moves with a movement of the movable part. At least a part of the electrical conductor moves, overlapping the touch panel, as viewed in a plan view observing the touch panel. The movable part and the electrical conductor are electrically continuous to each other.

7 Claims, 7 Drawing Sheets

ELECTRONIC DEVICE AND WEARABLE DEVICE

CROSS-REFERENCE TO RELATED APPLICATION

This nonprovisional application claims the benefit of Japanese Patent Application No. 2017-111317 filed Jun. 6, 2017, the enter disclosure which is incorporated herein by reference.

BACKGROUND

1. Technical Field

The present invention relates to an electronic device and a wearable device.

2. Related Art

Recently, information devices have been increasingly reduced in size. For example, wristwatch-type wearable devices (wrist devices) are widely known and the miniaturization of terminals such as mobile phone (smartphone) is notable. Operability is important for these devices. An information device with a small display screen such as a wrist device may use a user interface (hereinafter referred to as UI) of a deep hierarchical structure. Therefore, with normal button operations, the user needs to repeat an operation to select and decide an item and therefore may find the work troublesome.

Particularly with a wrist device for sports, it is difficult to frequently look at the screen during competitions. Thus, eyes-free operation (operation carried out by the user without viewing the device) is desired.

Also, a timepiece having a rotating bezel is broadly known. Various techniques of using the rotating bezel as the UI of an electronic device (wrist device) have been proposed. For example, a technique in which a mechanical switch using a cam slope, a slide pin and the like is combined with the rotating bezel to detect the position of rotation and the amount of rotation, or a technique in which magnetic poles are provided on the rotating bezel and in which the switching of the magnetic poles is counted using a Hall element, to detect the amount of rotation, is known. Therefore, it is conceivable that the use of a rotating bezel can realize a UI which can be easily used by eyes-free operation.

However, the technique of detecting the rotation of the rotating bezel with the mechanical switch has the problem of low detection accuracy and complex (large-sized) mechanism. Meanwhile, the technique of detecting the rotation of the rotating bezel using the Hall element has the problem that it is difficult to detect the absolute position of the bezel and that it is difficult to install another sensor (magnetic sensor) which may be affected by magnetism.

Thus, some devices such as wearable device and mobile phone have a so-called touch panel, on which the user carries out operations by touching with a finger or the like. For example, US patent application publication No. 2009/0059730 discloses a wrist device having a fixed bezel with a built-in touch sensor. According to US patent application publication No. 2009/0059730, the position of a finger on the bezel is specified using the touch sensor, and screen transition or the like is controlled according to the amount of movement of the finger.

However, when the wrist device of US patent application publication No. 2009/0059730 detects the touch area of the finger touching the bezel by the touch sensor, the fingertip, if wet a drop of water, comes in contact with the bezel over an area corresponding to the size of the drop of water. That is, the fingertip and the bezel are not in point contact and the accurate position (absolute position) of the finger on the bezel cannot be specified. This causes the problem of low accuracy of detecting the touch area of the finger and inability to detect the touch area at all.

SUMMARY

An advantage of some aspects of the invention is to solve at least a part of the problems described above, and the invention can be implemented as the following embodiments or application examples.

An aspect of the invention relates to an electronic device including: an electrostatic capacitance-type touch panel; an electrically conductive movable part; and an electrical conductor which moves with a movement of the movable part. At least a part of the electrical conductor moves, overlapping the touch panel, as viewed in a plan view observing the touch panel. The movable part and the electrical conductor are electrically continuous to each other.

In this configuration, at least a part of the electrical conductor moves in an area overlapping the touch panel, with a movement of the movable part. The electrical conductor is electrically continuous to the movable part. With this configuration, the position and the amount of movement of the movable part are detected using the touch panel. This enables very accurate detection or the like. Also, in the state where the user is not touching the movable part, no current flows to the electrical conductor from the living body. This can reduce erroneous detection of an operation that is not intended by the user.

In the aspect of the invention, the movable part may be a rotating body arranged in such a way as to overlap the touch panel as viewed in the plan view and capable of rotating about a predetermined axis as an axis of rotation.

This configuration enables detection of the absolute position and the amount of rotation of the rotating body, using the touch panel.

In the aspect of the invention, the electronic device may include an insulator provided on a surface on the touch panel side of the movable part.

This configuration enables enhanced waterproofness or the like with the insulator filling the gap between the movable part and the touch panel.

In the aspect of the invention, a penetration part penetrating the insulator from a surface on the movable part side to a surface on the touch panel side may be provided at a part of the insulator, and the electrical conductor may be provided in the penetration part.

This configuration enables proper arrangement of the electrical conductor and the insulator.

In the aspect of the invention, the electronic device may include a pressing mechanism which presses the insulator in a direction toward the touch panel.

This configuration enables enhanced waterproofness or the like with the insulator in tight contact with a member (for example, a cover) on the touch panel side.

In the aspect of the invention, the pressing mechanism may include a holding member, and an elastic member provided between the holding member and the movable part. When a direction from the touch panel toward the electrical conductor is defined as a first direction, a circumferential surface in contact with the elastic member, of the holding member, may be a surface sloped in such a way that an inner diameter of the circumferential surface becomes greater as it goes in the first direction.

This configuration can realize the pressing mechanism by providing a predetermined sloped surface.

In the aspect of the invention, the electronic device may also include a display panel, the touch panel may be arranged in such a way as to cover the display panel, and the electrical conductor may move with a movement of the movable part in an area overlapping a part of the touch panel as viewed in the plan view.

In this configuration, a part of the area of the touch panel is used for the detection of the movable part (electrical conductor). This enables the traditional touch panel operation or the like in another area of the touch panel.

In the aspect of the invention, the electronic device may include a display panel, the touch panel may be provided in an area where the display panel and the movable part overlap each other, as viewed in the plan view, and the electrical conductor may move with a movement of the movable part in the area where the touch panel is provided, as viewed in the plan view.

This configuration enables the provision of the touch panel for the detection of the movable part (electrical conductor) and the omission of the touch panel in the other areas of the display panel.

In the aspect of the invention, the electronic device may include a processing circuit which detects a position of the electrical conductor on the touch panel.

This configuration enables the detection of the position of the electrical conductor, based on the electrostatic capacitance between the electrodes of the touch panel.

In the aspect of the invention, the electronic device may include a notification unit which gives a user a notification, using at least one of sound, vibration, and light, and the notification unit may give the notification if it is detected that the electrical conductor is situated at a predetermined position.

This configuration enables the notification about the absolute position of the movable part to be given to the user.

Another aspect of the invention relates to a wearable device including the electronic device described in one of the foregoing descriptions.

In the aspect of the invention, the wearable device may include a timekeeping unit.

This configuration can realize a proper interface or the like in a wearable device which shows a display about time information or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described. The embodiments described below should not unduly limit the content of the invention described in the appended claims. No all the configurations described in the embodiment are necessarily essential components of the invention.

1. First Embodiment

The operation interface in a small-sized light-weight device is more limited in number and type than in a PC (personal computer) or the like. However, with the increase in functions of information terminals, small-sized light-weight devices with various functions have been becoming available. To properly use such various functions, the UI is increasingly important.

Particularly wearable devices such as wrist device often need operating during sports competitions or exercises. For example, for a wearable device used in triathlon, information to be measured or displayed varies, depending on which of swimming, cycling, and running is being carried out. Therefore, it is assumed that a wearable device has a plurality of modes such as a swimming mode, a cycling mode, a running mode, a mountaineering mode, and a trekking mode, and switches modes according to an operation by the user.

In this case, it is conceivable that, in view of time-saving or avoiding the risk of collision or the like, the user carries out eyes-free operation, instead of switching modes, viewing the wearable device each time. That is, a UI suitable for eyes-free operation is very important.

To this end, a UI using a rotating bezel is suitable for eyes-free operation. This is because an operation to rotate the bezel requires a certain degree of force, and when an effective operation (rotational movement of the bezel) is carried out, physical feedback in the form of a different sense of touch is given to the user. This enables secure and accurate operations on the wearable device even during competitions.

However, if the rotating bezel is used as the UI, the rotation of the rotating bezel needs to be detected with high accuracy. In this respect, it is difficult to detect the amount of rotation with high accuracy by the detection technique with the mechanical switch. This technique also has the problem of complex mechanisms due to the need to provide mechanisms such as the cam slope and the slide pin, thus making the miniaturization of the device difficult.

Meanwhile, with the technique for detecting the rotation of the rotating bezel using the Hall element, the amount of rotation (relative position of the bezel) can be detected. However, this technique has the problem that it is difficult to detect the absolute position of the bezel. Also, since magnetic poles are provided on the bezel, it is not easy to install sensors that may be affected by magnetism (magnetic compass, magnetic sensor and the like), in the device. If a magnetic compass is installed, for example, measures need to be taken, such as designing the bezel and the magnetic compass so as to be apart from each other, providing a member to serve as a magnetic shield between the bezel and the magnetic compass, or carrying out calibration in consideration of the magnetism (magnetic field) from the bezel, in the detection processing of the magnetic compass.

Also, various devices including a touch sensor (touch panel) as in US patent application publication No. 2009/0059730 are known. The touch panel in this case is assumed to be an electrostatic capacitance-type touch panel and particularly a projection-type touch panel. However, if a finger is used for operations on the touch panel, it is difficult for the user to accurately touch an intended site because the contact surface between the finger and the touch area has a certain size of area. Particularly with a device in which the touch panel has a small area, such as a wearable device, a touch panel operation using a finger may not enable the user to touch a desired position. Also, with the electrostatic capacitance-type touch panel, if water, which is electrically conductive, adheres to the touch area, a touch may be erroneously detected at a site that is not touched by the user. Moreover, even when the user touches the touch panel with a finger with an intention to operate, the water adhering thereto causes the state where the contact surface is expanded. This may reduce detection accuracy or make the detection difficult.

In contrast, an electronic device 100 according to this embodiment includes an electrostatic capacitance-type touch panel 160, an electrically conductive movable part 110, and an electrical conductor 120 which moves with a movement of the movable part 110. At least a part of the electrical conductor 120 moves in an area overlapping the touch panel 160 (moves while overlapping the touch panel 160), as viewed in a plan view from a direction overlapping the touch panel 160 (as viewed in a plan view observing the touch panel 160). The movable part 110 and the electrical conductor 120 are electrically continuous to each other. In the description below, an example where the entirety of the electrical conductor 120 moves in the area overlapping the touch panel 160 (moves only in the area overlapping the touch panel 160) is described. However, the technique of this embodiment is not limited to this example. For example, a part of the range of movement of the electrical conductor 120 with the movement of the movable part 110 may overlap the touch panel 160, and the other parts of the range may not overlap the touch panel 160.

Figure 1:
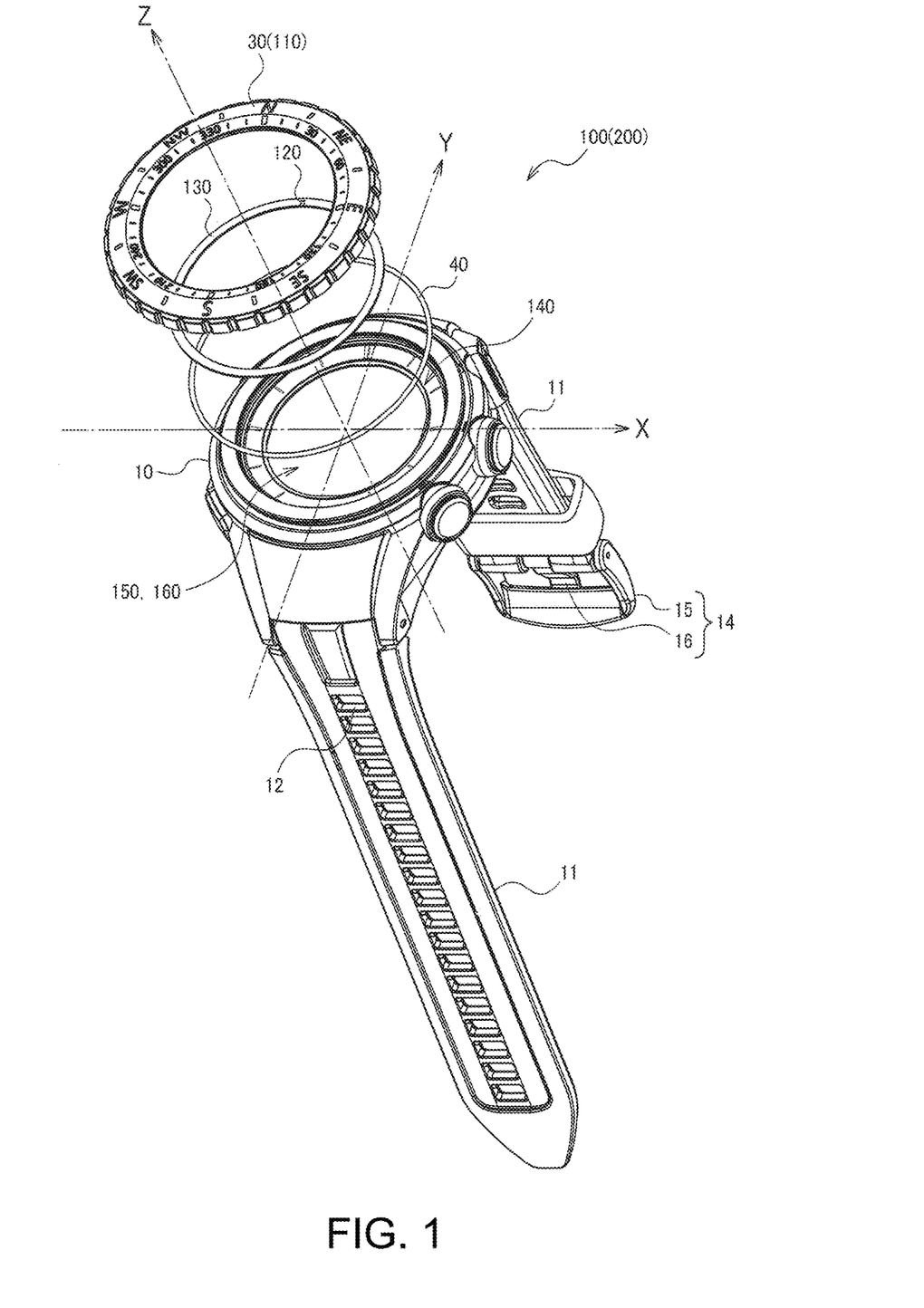
FIG. 1 is a perspective view (exploded view) of a wearable device including an electronic device.

FIG. 1 is a perspective view (exploded view) of a wearable device 200 including the electronic device 100 according to this embodiment. The wearable device 200 is not limited to the configuration of FIG. 1 and can be implemented with various modifications such as omitting a component or components of the configuration or adding another component. FIG. 1 shows an example where the movable part 110 is a rotating bezel 30 that can be used as a compass. Recesses and protrusions are provided on a lateral part of the movable part 110, and a scale, letters, and numerals are provided on a top part. However, the shape of the movable part 110 (rotating bezel 30) can be implemented with various modifications.

As shown in FIG. 1, the wearable device 200 includes a casing (case part) 10, and a strap part 11 to secure the casing 10 to the body (in a narrow sense, the wrist) of the user. The strap part 11 is provided with a fitting hole 12 and a buckle 14. The buckle 14 is made up of a buckle frame 15 and an engaging part (prong) 16. In the wearable device 200, the strap part 11 is provided with a plurality of fitting holes 12, and the engaging part 16 of the buckle 14 is inserted into one of the plurality of fitting holes 12, thus allowing the user to wear the device. The plurality of fitting holes 12 is provided in the longitudinal direction of the strap part 11, as shown in FIG. 1.

The casing 10 of the wearable device 200 is provided with a cover (light-transmissive substrate, windproof plate, windproof member, windproof glass) 140, a display panel (display unit) 150, the touch panel (touch sensor) 160, and a substrate (not illustrated) including a processing circuit or the like. In the casing 10, an opening situated on the side opposite to the subject (the wrist of the user) when the user wears the device, and the cover 140 are fitted with each other. That is, the cover 140, in the state of being installed in the casing 10, is provided on the opening side exposed outside. Thus, the cover 140 and the casing 10 together form a closed space. The display panel 150, the touch panel 160, and the substrate are provided inside the closed space formed by the cover 140 and the casing 10. That is, the cover 140 is a member to restrain an inflow of liquid or the like into the casing from outside or to restrain an impact on the display panel 150 or the like provided inside the casing. In a narrow sense, the cover 140 is a windproof glass of a wristwatch.

The display panel 150 has its display surface laid in a direction along the surface of the cover 140 and is provided at a position closer to the casing 10 than the cover 140. In other words, in the state where the wearable device 200 is mounted at a predetermined site (wrist or the like) on the user, the display panel 150 is provided at a position closer to the predetermined site than the cover 140.

The touch panel 160 has its surface where a plurality of electrodes is arranged laid in a direction along the surface of the cover 140 and is provided at a position closer to the casing 10 than the display panel 150. In FIG. 1, for the sake of convenience, the reference number (160) of the touch panel is provided at the same position as the display panel 150. However, the touch panel 160 is situated more to the depth than the display panel 150 and therefore cannot be directly visible.

In FIG. 1, and in FIGS. 2 and 3 described later, a coordinate system is set in which the casing 10 of the wearable device 200 is a reference point. A direction which intersects the display surface of the display panel 150 and heads toward a back side (bottom side) to a face side, where the display surface side of the display panel 150 is the face side (top side), is defined as a positive Z-axis direction. Alternatively, a direction moving away from the casing 10 in the direction of a normal line to the display surface of the display panel 150 may be defined as a positive Z-axis direction. In the state where the wearable device 200 is mounted on the subject, the positive Z-axis direction is equivalent to a direction from the subject toward the casing 10. Two axes orthogonal to the Z-axis are defined as an X-axis and a Y-axis. Particularly a direction in which the strap part 11 is attached to the casing 10 is set as the Y-axis.

Figure 2:
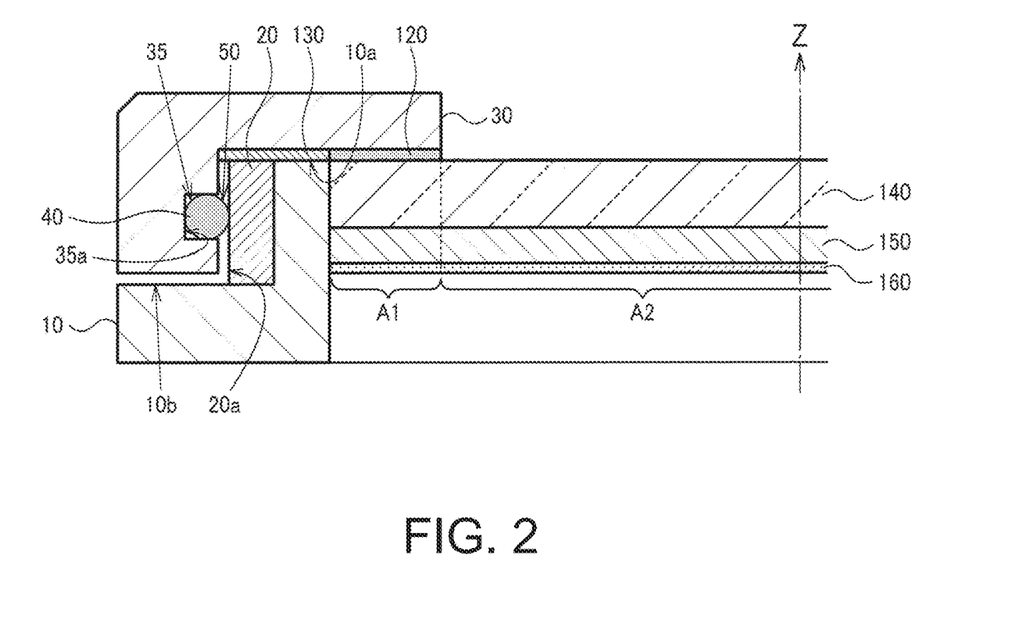
FIG. 2 is a cross-sectional view of a wearable device according to a first embodiment.
Figure 3:
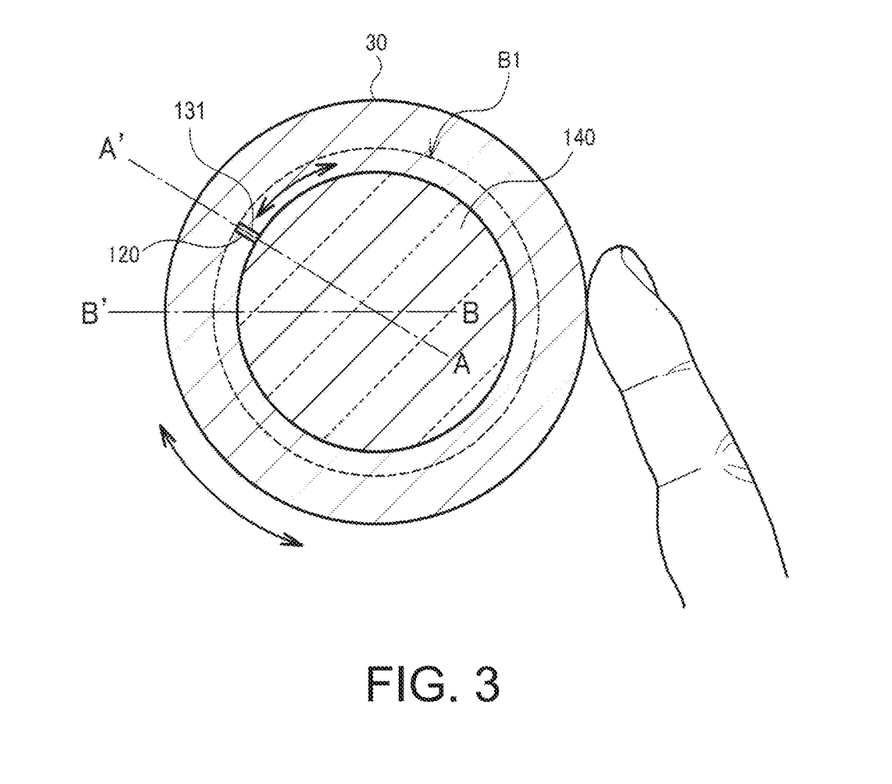
FIG. 3 is a plan view of the wearable device according to the first embodiment.

FIG. 2 is a cross-sectional view taken along the YX plane in FIG. 1 (A-A' in FIG. 3). FIG. 3 is a plan view showing the wearable device 200 (particularly excluding the strap part 11) observed in the negative Z-axis direction from a point of view provided closer to the positive Z-axis direction side than the wearable device 200. In the description below, the observation state shown in FIG. 3, that is, the state where the wearable device 200 is observed from a direction of intersecting (in a narrow sense, orthogonal to) the touch panel surface, is described as "viewed in a plan view". In FIGS. 2 and 3, the shape of the rotating bezel or the like is simplified. FIG. 3 is also a view for explaining the movement of the electrical conductor 120 when the user operates the movable part 110. A dashed line B1 in FIG. 3 indicates the outer circumference of the cover 140, the display panel 150, and the touch panel 160. That is, the area between the inner circumference of the rotating bezel 30 and the dashed line B1 corresponds to A1 in FIG. 2 and represents a touch area in this case (particularly a touch area for detecting the rotation of the rotating bezel 30).

As shown in FIG. 2, the cover 140, the display panel 150, and the touch panel 160 are stacked in the Z-axis direction. As shown in FIGS. 2 and 3, the rotating bezel 30 is installed in such a way as to overlap a peripheral edge part of the cover 140, as viewed in the plan view. The electrical conductor 120 (contact) is provided on the surface on the cover 140 side (bottom surface) of the rotating bezel 30. As shown in FIG. 3, the electrical conductor 120 rotates with the rotation of the rotating bezel 30. For example, the bottom surface of the rotating bezel 30 and the electrical conductor 120 are bonded together.

In this way, in the electronic device 100 of this embodiment, the electrical conductor moves within the touch area with the movement of the movable part 110. The touch area in this case refers to the area where the touch panel 160 is provided as viewed in the plan view and where a change in capacitance can be detected by the touch panel 160. Since a projection-type touch panel is assumed here as the electrostatic capacitance-type touch panel 160, the touch panel 160 can detect a change in capacitance due to the electrical conductor 120 even if the electrical conductor 120 is not in direct contact with the surface of the touch panel 160. In the example of FIG. 2, the touch area is the area on the top surface (surface on the positive Z-axis direction side) of the cover 140 and overlapping the touch panel 160 as viewed in the plan view.

The technique of this embodiment can realize a UI using the movable part 110. The movable part 110 is a mechanism that is movable in response to a force applied by the user and gives physical feedback based on an operation. Therefore, the movable part 110 is suitable for eyes-free operation. Also, since the position of the movable part 110 is detected using the touch panel 160, there is no need to provide a mechanical switch and magnetic poles.

The top surface (touch area) of the cover 140 is not directly touched by a finger of the user but is touched by the electrical conductor 120. Therefore, if the area of the electrical conductor 120 as viewed in the plan view (particularly the area of the part overlapping the touch area) is reduced, the position of the electrical conductor 120 can be detected with high accuracy. For example, the area of the electrical conductor 120 may be made smaller than the area of the contact surface with a finger. Ideally, the detection of the position of the electrical conductor 120 can be executed with a similar degree of accuracy as the resolution of the touch panel 160.

The relative positions of the electrical conductor 120 and the movable part 110 are already known at the time of design. In the example of FIG. 1, the electrical conductor 120 is provided at the position of north (N, 0°) on the compass. Therefore, detecting the position of the electrical conductor 120 enables the detection of the absolute position of the movable part 110. It is also possible to find the amount of movement (in a narrow sense, the amount of rotation) of the movable part 110 by using a change (difference) in the absolute position.

Moreover, in the embodiment, the area overlapping the movable part 110 as viewed in the plan view, of the touch area, is not exposed outside. Therefore, in the detection of the position of the electrical conductor 120 (movable part 110), the entry of outside air, moisture and the like into the touch area can be restrained. This enables accurate detection of an operation by the user even when the movable part 110 or the user's finger is wet, or even when the device is used in the water.

In the technique of this embodiment, if the user touches the electrically conductive movable part 110, a weak current flows through the movable part 110 and through the electrical conductor 120 electrically continuous to the movable part 110. The touch panel 160 detects a change in electrostatic capacitance due to this current (electric charge). Therefore, it is assumed that the detection of the position of the electrical conductor 120 (detection of the position and the amount of movement of the movable part 110) by the touch panel 160 is not carried out unless the user touches the movable part 110 with a hand. In sports or the like, there are cases where the wearable device 200 may accidentally collide with a piece of equipment or the like of the user, and the movable part 110 may move against the intention of the user. In this respect, this embodiment can restrain erroneous detection of an operation because the detection of the position of the electrical conductor 120 (movable part 110) is not carried out in response to an unintended collision or the like. In the water, due to the electrical conductivity of the water itself, the touch panel 160 may detect a change in capacitance even if the user does not touch the movable part 110 with a hand (for example, simply because a hand of the user is near the movable part 110). However, even in the water, the movement of the movable part 110 is not detected unless both conditions that a living body is close enough to the movable part 110 to generate a change in capacitance and that the movable part 110 moves accidentally due to a collision or the like are satisfied simultaneously. That is, this embodiment makes it possible to restrain erroneous detection of an operation against the intention of the user even during use in the water.

As described above, the technique of the embodiment can realize an interface that allows eyes-free operation, has high detection accuracy, can be used in a harsh environment (where the device becomes wet with water or in the water), and can restrain the detection of an operation against the intention of the user. Also, since no mechanical switch is needed, the device can be miniaturized and can be easily equipped with a sensor such as a magnetic compass.

The movable part 110 in this case may be a rotating body which is arranged in such a way as to overlap the touch panel 160 as viewed in the plan view and which is rotatable about a predetermined axis as its axis of rotation. With the interface using a rotating body, it is possible to restrain erroneous operations by limiting the range of rotation and the direction of rotation, or to realize flexible operation input by not limiting the range of rotation and the direction of rotation.

Here, first, the rotating bezel 30 is described as an example of the movable part 110 which is a rotating body, as shown in FIGS. 1 to 3. As shown in FIG. 1 and the like, the rotating bezel 30 refers to an edge member which is provided on the peripheral edge part of the casing 10 as viewed in the plan view and which is rotatable about an axis along the Z-axis direction (which may be an axis in a direction intersecting the display surface of the display panel 150 or may be the Z-axis itself) as its axis of rotation. However, as the movable part 110, a cylindrical rotating body may be used or a component that is not a rotating body (for example, a slide part) may be used. Modifications of the movable part 110 will be described later with reference to FIGS. 10 to 12.

As shown in FIG. 2, in the electronic device 100 (wearable device 200) in this embodiment, there is a gap between the top surface of the peripheral edge part (surface on the positive Z-axis direction side) of the cover 140, and the bottom surface (surface on the negative Z-axis direction side) in the area overlapping the cover 140 (touch panel 160) as viewed in the plan view, of the rotating bezel 30. The electrical conductor 120 is provided in this gap. If the gap is not filled with a certain member, outside air, moisture and the like may enter the inside of the casing of the wearable device 200.

Thus, the electronic device 100 further includes an insulator 130 (spacer) provided on the surface on the touch panel 160 side of the movable part 110 (rotating bezel 30). The provision of the insulator 130 enables restraining the entry of outside air, moisture and the like from the gap between the rotating bezel 30 and the cover 140, and thus enables the electronic device 100 to be highly waterproof. The member in contact with the touch area is the insulator 130 except the electrical conductor 120. Therefore, erroneous detection of a point outside the position of the electrical conductor 120 by the touch panel 160 (change in electrostatic capacitance) can be restrained.

Specifically, the electrical conductor 120 may be provided in a part of the area (touch area) where the rotating bezel 30 and the touch panel 160 overlap each other as viewed in the plan view, and the insulator 130 may be provided in the other area of the touch area. Also, in view of detecting the position of the electrical conductor 120, it is not preferable that the insulator 130 is provided between the electrical conductor 120 and the cover 140.

Thus, in this embodiment, a penetration part 131 (cut-out or hole part) penetrating the insulator 130 from the surface on the movable part 110 side to the surface on the touch panel 160 side is provided at a part of the insulator 130. The electrical conductor 120 is provided in the penetration part 131.

Figure 4:
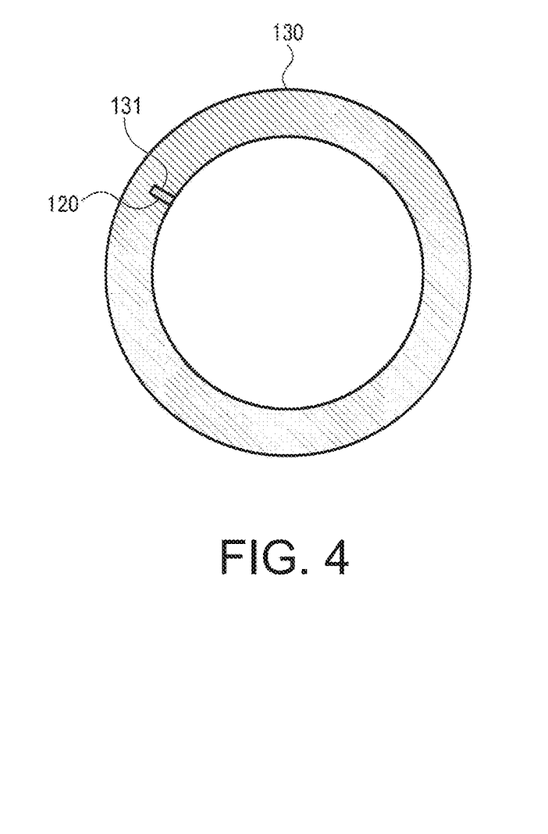
FIG. 4 is a plan view of an electrical conductor and an insulator.
Figure 5:
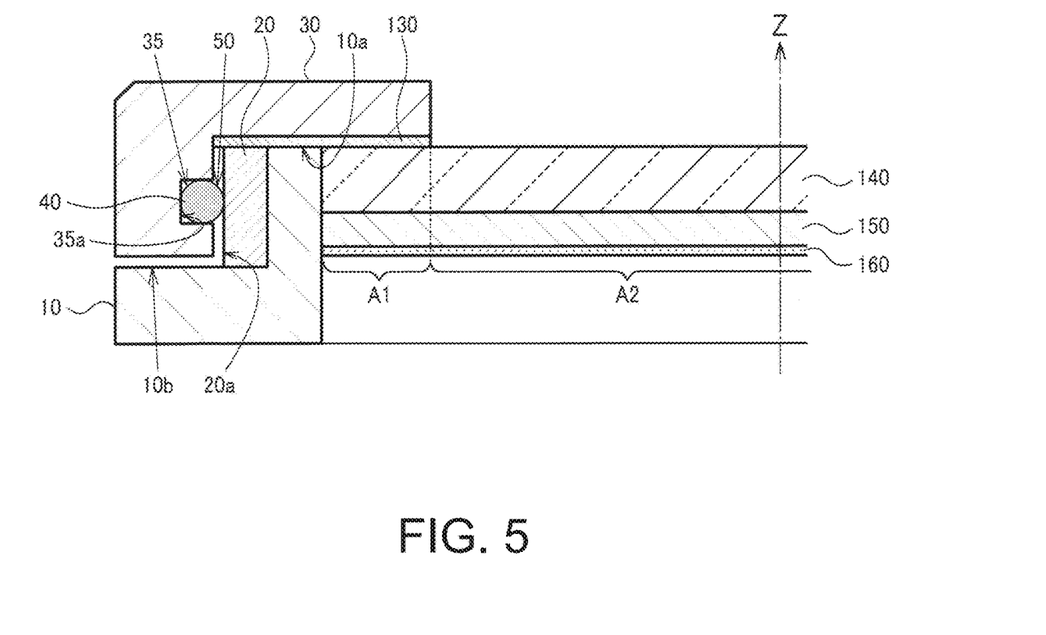
FIG. 5 is another cross-sectional view of the wearable device according to the first embodiment.

FIG. 4 is a plan view showing the insulator 130 and the electrical conductor 120 according to this embodiment. FIG. 5 is a cross-sectional view taken along B-B' in FIG. 3. In the example of FIG. 4, the insulator 130 is annular (ring-shaped, between two concentric circles) as viewed in the plan view. The penetration part 131 (cut-out) is provided at a part of the insulator 130 and this penetration part 131 is filled with the electrical conductor 120. The penetration part 131 in this case is a cut-out provided on the inner circumferential side (from the inner circumferential edge to a halfway position to the outer circumferential edge) of the annular insulator 130 and is shaped not to reach the outer circumferential edge. However, the shape of the penetration part 131 is not limited to this. The penetration part 131 may range from the inner circumferential edge to the outer circumferential edge. Alternatively, the penetration part 131 may be a hole part (a closed area in the annular insulator 130 as viewed in the plan view) instead of a cut-out.

As shown in FIG. 2, as the penetration part 131 is provided penetrating the insulator 130 from the rotating bezel 30 side to the touch panel 160 side, the electrical conductor 120 provided in the penetration part 131 comes in contact with the rotating bezel 30 and the cover 140. That is, the electrically conductive rotating bezel 30 is electrically continuous to the touch area via the electrical conductor 120. This enables the touch panel 160 to detect the position of the electrical conductor 120 in response to a touch operation on the rotating bezel 30 by the user. Meanwhile, as shown in FIG. 5, the gap is filled by the insulator 130 at a position not provided with the electrical conductor 120, in the touch area. This makes it possible to realize high waterproofness and restrain erroneous detection, as described above.

In view of waterproofness, the electronic device 100 (wearable device 200) may include a holding member 20, and an elastic member 40 provided between the holding member 20 and the movable part 110. As shown in FIGS. 1 and 2, the elastic member 40 is an annular (ring-shaped) packing and the holding member 20 is an annular member (fixed ring) provided on the inner circumferential side of the elastic member 40 as viewed in the plan view. The cross-sectional shape of the elastic member 40 is not limited to a circle and may be any shape that can be elastically deformed when pressed by the holding member 20 and the rotating bezel 30. For example, the elastic member 40 may be elliptic, track-shaped (made up of segments and arcs), or quadrilateral.

The casing 10 includes a first surface 10a in contact with the insulator 130, and a second surface (placing part 10b) provided more to the outer circumferential side as viewed in the plan view than the first surface. The holding member 20 and a part of the rotating bezel 30 (a second member 32, described later, which is an outer circumferential part) are placed opposite the placing part 10b. The rotating bezel 30 is provided with a groove 35. The elastic member 40 is accommodated in an elastic member accommodation part 50 formed by the groove 35 and the holding member 20 (an outer circumferential surface 20a of the holding member 20). The elastic member 40 is in contact with a groove surface 35a which is the surface on the outer circumferential side of the groove 35, and with the outer circumferential surface 20a of the holding member 20.

As the elastic member 40 is accommodated in the elastic member accommodation part 50, the elastic member 40 is pressed between the outer circumferential surface 20a of the holding member 20 and the groove surface 35a of the rotating bezel 30 and thus elastically deformed. This generates a compression elastic force. The compression elastic force acts in a direction of pushing the rotating bezel 30 to outside the holding member 20 and thus restrains the rotating bezel 30 from wobbling in a direction intersecting the axis of rotation (Z-axis). Thus, the operability of the rotating bezel 30 to rotate smoothly can be achieved.

In this way, the electronic device 100 (wearable device 200) of this embodiment has high waterproofness. Therefore, when various sensors such as acceleration sensor, angular velocity sensor, geomagnetic sensor, barometric sensor (altimeter), biological sensor (for example, photoelectric sensor), and GPS receiver, are installed in the wearable device 200, these sensors can be stored inside the highly waterproof casing 10. Therefore, malfunctions and operation errors can be restrained.

As shown in FIGS. 2 and 3, the electronic device 100 also includes the display panel 150. The touch panel 160 is arranged in such a way as to cover the display panel 150 (in an area covering the display panel 150) as viewed in the plan view. The electrical conductor 120 moves with the movement of the movable part 110, in an area overlapping a part of the touch panel as viewed in the plan view.

This configuration makes it possible to use the peripheral edge part (A1 in FIG. 2) of the touch panel 160 for the detection of the rotation of the rotating bezel 30, and to use the center part (A2 in FIG. 2) of the touch panel 160 for an operation similar to the normal touch panel operation. The center part of the touch panel 160 can be used, for example, for the interface to detect a touch by a finger of the user.

In this case, the peripheral edge part and the center part of the touch panel 160 need not be separately provided as different components and can be formed as an integrated touch panel. That is, the configuration of the touch panel 160 itself can be the same as in the related-art wearable device 200. Specifically, it is possible to easily realize the wearable device 200 according to this embodiment, simply by adding the rotating bezel 30 with the electrical conductor 120 and the insulator 130 (spacer) bonded thereto, which are described above with reference to FIG. 1 and the like, to the related-art wearable device 200 having the touch panel 160. That is, a device that detects two operations, that is, the rotation of the rotating bezel 30 and the normal touch panel operation, can be realized with a configuration that can be implemented easily.

The rotating bezel 30 may be a removable attachment. In this case, the user or the manufacturer of the wearable device can select whether to attach the rotating bezel 30 or to use the device as a wearable device similar to the related art without attaching the rotating bezel 30, according to the circumstances. The processing circuit carries out different processing when a touch is detected on the peripheral edge part of the touch panel 160, between the case where the rotating bezel 30 is attached and the case where the rotating bezel 30 is not attached. Thus, it is preferable that the wearable device 200 is configured in such a way that the processing circuit can recognize whether the rotating bezel 30 is attached or not. For example, the user or the like may store information (for example, flag information) representing the attachment state of the rotating bezel 30 into a memory (register) readable by the processing circuit.

The electronic device 100 (wearable device 200) also includes a processing circuit which detects the position of the electrical conductor 120 on the touch panel 160. The processing circuit is provided on a substrate, not illustrated. The substrate is provided, for example, more to the bottom surface side (negative Z-axis direction side) than the touch panel 160 in the casing 10 and is electrically connected to the touch panel 160.

The electrostatic capacitance-type touch panel 160 includes an electrode array (X electrodes) arranged in a first direction, and an electrode array (Y electrodes) arranged in a second direction intersecting the first direction. When the touch panel 160 is touched at a predetermined position, the capacitance value between the electrodes corresponding to the touched position becomes higher than the capacitance value between the electrodes corresponding to a position that is not touched. The processing circuit detects (scans) the capacitance values between the respective electrodes and detects electrodes between which the capacitance value is higher. The processing circuit thus carries out the detection of the position of the electrical conductor 120.

The electronic device 100 (wearable device 200) may also include a notification unit which gives the user a notification, using at least one of sound, vibration, and light. That is, the notification unit in this case is implemented by one of a speaker, a vibration unit (vibrator, motor), and a light emitting unit (LED or the like), or a combination of two or more of these. A notification may also be given using something other than sound, vibration, or light.

The notification unit gives a notification if it is detected that the electrical conductor 120 is situated at a predetermined position. This enables a notification to be given to the wearer in the form of a buzz (sound), vibration, a light being turned on or off, and the like, when the rotating bezel 30 is set at a specific position. Since the technique of this embodiment enables the detection of the absolute position of the rotating bezel 30, as has been described, the processing circuit can detect whether the rotating bezel 30 is set at a specific position or not.

In a wearable device used for triathlon, a swimming mode, a cycling mode, and a running mode are three important modes. In each mode, execution of various functions (command) and transitions between sub-modes and the like are carried out. For devices other than this, it is also conceivable that operations with high degrees of importance and operations with low degrees of importance exist. Thus, by defining the operation to set the rotating bezel 30 at a specific position as an operation with a high degree of importance, it is possible to notify the user that the operation of a high degree of importance is carried out.

The electronic device 100 described above may also be a component constituting a part of a finished product, that is, a detection unit which detects the movement of the movable part 110, using the touch panel 160 and the electrical conductor 120. In this case, the electronic device 100 can be installed in various apparatuses (devices, terminals). For example, the technique of this embodiment can be applied to the wearable device 200 including the electronic device 100, as has been described.

The wearable device 200 according to this embodiment may include an additional component. For example, the wearable device 200 further includes a timekeeping unit which acquires time information. The time information in this case may be information such as absolute time, time elapsed from a predetermined timing, or time stamp. The component included in the wearable device 200 is not limited to this. The wearable device 200 may also include a body motion sensor which detect body motion information of the user (wearer), a barometric sensor, and a biological sensor which detects biological information of the user. The body motion sensor is, for example, an acceleration sensor, angular velocity sensor, GPS receiver, or the like. The barometric sensor detects the atmospheric pressure in the area where the user is present, and thus can detect the altitude based on the signal of the detected atmospheric pressure. The biological sensor is a pulse wave sensor, arterial blood oxygen saturation sensor or the like. Specifically, the biological sensor can be implemented by a photoelectric sensor including a light emitting unit and a light receiving unit.

2. Second Embodiment

As described in the first embodiment, with the insulator 130 filling the gap between the movable part 110 (rotating bezel 30) and the cover 140, high waterproofness can be achieved. To increase waterproofness, it is important that the insulator 130 is in tight contact with the cover 140.

Thus, the electronic device 100 (wearable device 200) of this embodiment include a pressing mechanism which presses the insulator 130 in a direction toward the touch panel. With this configuration, the degree of contact between the insulator 130 and the cover 140 is higher than in the case where no pressing mechanism is provided. This enables higher waterproofness.

The pressing mechanism in this case includes the holding member 20, and the elastic member 40 provided between the holding member 20 and the movable part 110. When the direction from the touch panel 160 toward the electrical conductor 120 (positive Z-axis direction) is defined as a first direction, the circumferential surface in contact with the elastic member 40 of the holding member 20 (for example, the outer circumferential surface 20a described later) is sloped in such a way that the inner diameter of the circumferential surface (for example, D3 and D4 described later) increases as it goes in the first direction.

Figure 6:
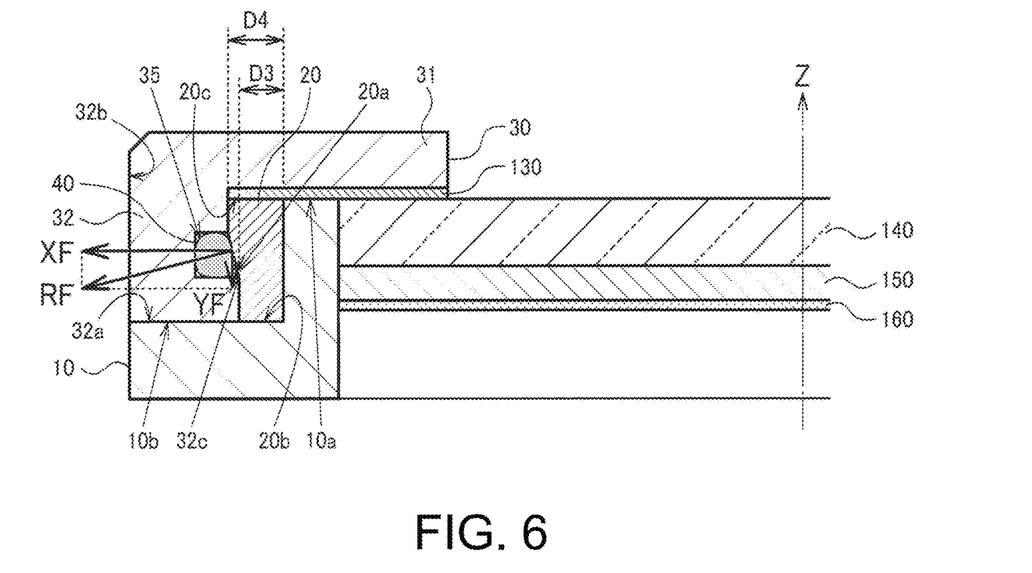
FIG. 6 is a cross-sectional view of a wearable device according to a second embodiment.

FIG. 6 is a cross-sectional view of the electronic device 100 (wearable device 200) according to a second embodiment. The electronic device 100 according to this embodiment is different from the electronic device 100 according to the first embodiment in the configuration of the rotating bezel 30 and the holding member 20. Therefore, the same components as those of the electronic device 100 according to the first embodiment such as the cover 140 and the touch panel 160 will not be described further.

As shown in FIG. 6, the holding member 20 has a bottom surface 20b facing the placing part 10b, at an end part on the placing part 10b side of the casing 10, and has a top surface 20c arranged on the side opposite to the bottom surface 20b facing the placing part 10b. The outer circumferential surface 20a is formed between an end part on the outer side of the top surface 20c and an end part on the outer side of the bottom surface 20b. On the outer circumferential surface 20a, the relation of D3<D4 holds, where D3 is the outer diameter of an intersection part between the bottom surface 20b and the outer circumferential surface 20a and where D4 is the outer diameter of an intersection part between the top surface 20c and the outer circumferential surface 20a. At least a part of the outer circumferential surface 20a is formed as a conical surface.

The rotating bezel 30 can be regarded as being made up of a first member 31 provided on the inner circumferential side as viewed in the plan view and a second member 32 provided on a peripheral edge part (outer circumferential part) of the first member 31 and extending in the negative Z-axis direction, compared with the first member 31. It should be noted that the first member 31 and the second member 32 are set for the sake of convenience of the description and therefore need not be formed separately in forming the rotating bezel 30. On the second member 32 of the rotating bezel 30, a bottom surface 32a arranged facing the placing part 10b of the casing 10 and an outer surface 32b ranging from an outer end part of the bottom surface 32a to the surface of the rotating bezel 30 are formed. Also, an inner surface 32c facing the outer circumferential surface 20a of the holding member 20 is arranged on the second member 32 of the rotating bezel 30. On the inner surface 32c, the groove 35 is formed along a direction intersecting the center axis of rotation (Z-axis). The groove 35 and the outer circumferential surface 20a of the holding member 20 together form the elastic member accommodation part 50, thus accommodating the elastic member 40.

The elastic member 40 is pressed by the conical outer circumferential surface 20a and the groove surface 35a and thus elastically deformed. A compression elastic force generated by the elastic deformation of the elastic member 40 acts on the elastic member 40 as an action force RF in a direction orthogonal to the outer circumferential surface 20a. The action force RF generates a component of force YF acting along the direction of the center axis of rotation and a component of force XF acting along a direction orthogonal to the center axis of rotation. The component of force XF acts on the rotating bezel 30 from the elastic member 40 in a direction orthogonal to the center axis of rotation. This restrains the rotating bezel 30 from wobbling in a direction intersecting the center axis of rotation and can make the rotation of the rotating bezel 30 smoother.

Meanwhile, the component of force YF acts in a direction in which the elastic member 40 presses the rotating bezel 30 toward the placing part 10b. Therefore, the insulator 130 (and the electrical conductor 120) bonded to the bottom surface of the rotating bezel 30 is similarly pressed in the negative Z-axis direction. The insulator 130 is thus pressed toward the touch panel 160 (onto the cover 140). Such a configuration implements a pressing mechanism and therefore enables improved waterproofness.

In the example described above, the groove 35 is provided on the rotating bezel 30 side, and the groove 35 and the outer circumferential surface 20a of the holding member 20 together form the elastic member accommodation part 50. However, the groove may be provided on the holding member 20 side. In other words, the pressing mechanism has the holding member 20 and the elastic member 40 provided between the holding member 20 and the movable part 110, and the surface (inner surface 32c) in contact with the elastic member 40 of the movable part 110 may be conically sloped with a diameter changing (monotonously decreasing) as it goes in the first direction (positive Z-axis direction).

Figure 7:
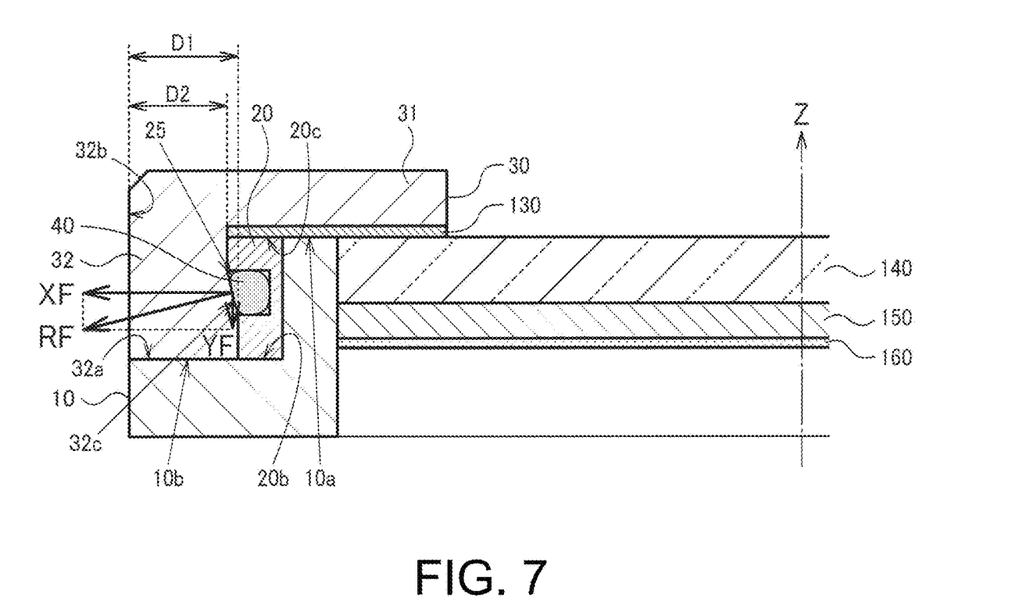
FIG. 7 is another cross-sectional view of the wearable device according to the second embodiment.

FIG. 7 is another cross-sectional view of the electronic device 100 (wearable device 200) according to this embodiment. As shown in FIG. 7, the inner surface 32c of the second member 32 of the rotating bezel 30 is formed by a circumferential lateral surface which is conically sloped with a diameter greater on the first member 31 side than on the bottom surface 32a side. That is, if the inner diameter at the intersection part between the inner surface 32c and the bottom surface 32a is D1 and the inner diameter at the intersection part between the inner surface 32c and the first member 31 is D2, the relation of D1>D2 holds. Also, on the outer circumferential surface 20a of the holding member 20, a groove 25 is formed in a direction intersecting the center axis of rotation. The groove 25 and the inner surface 32c of the rotating bezel 30 together form the elastic member accommodation part 50, thus accommodating the elastic member 40.

In the example of FIG. 7, too, the compression elastic force resulting from the elastic deformation of the elastic member 40 acts in a direction orthogonal to the inner surface 32c, which is a conically sloped surface, and forms an action force RF sloped toward the placing part 10b. The action force RF generates a component of force YF acting along the direction of the center axis of rotation (Z-axis) and a component of force XF acting along a direction intersecting the center axis of rotation. Thus, in this case, too, the pressing mechanism presses the insulator 130 toward the touch panel 160 (onto the cover 140). This enables improved waterproofness.

3. Modifications

Several modifications will be described below.

3.1 Modification of Touch Panel

Figure 8:
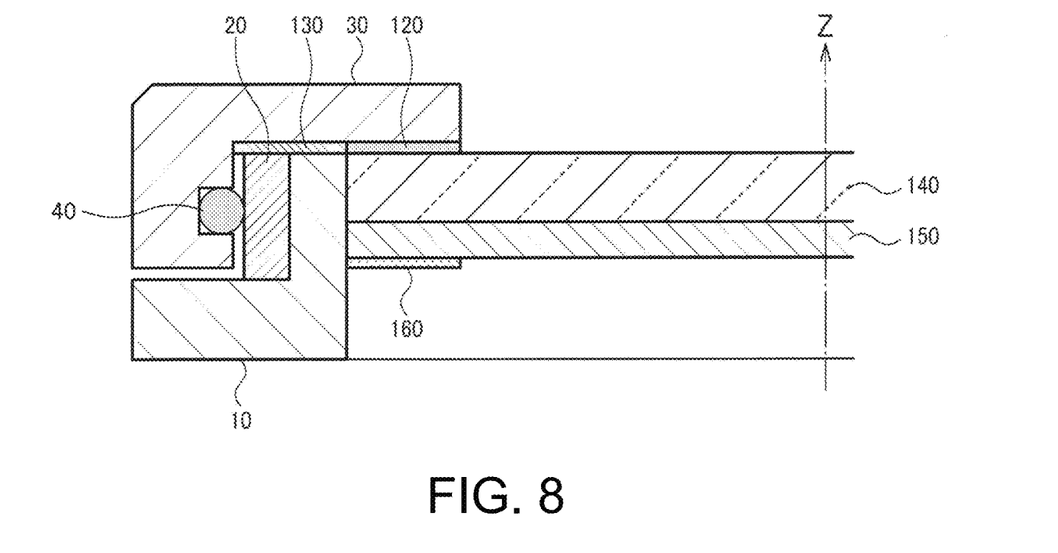
FIG. 8 is a cross-sectional view of a wearable device according to a modification.

FIG. 8 is a cross-sectional view of the electronic device 100 (wearable device 200) according to this modification. As shown in FIG. 8, the touch panel 160 of the electronic device 100 is provided in such a way that (in an area where) the display panel 150 and the movable part 110 overlap each other as viewed in the plan view. The electrical conductor 120 may move with the movement of the movable part 110, in the area where the touch panel 160 is provided as viewed in the plan view. That is, compared with FIG. 2 and the like, a modification can be made in which the touch panel 160 is not provided in the area where the rotating bezel 30 and the display panel 150 do not overlap each other.

In this configuration, the touch panel 160 is used exclusively to detect the rotation of the rotating bezel 30. Therefore, the traditional touch panel operation using a finger or the like cannot be used. However, it is possible to restrain erroneous detection due to the traditional touch panel operation and to save space and reduce costs by reducing the area of the touch panel 160.

Figure 9:
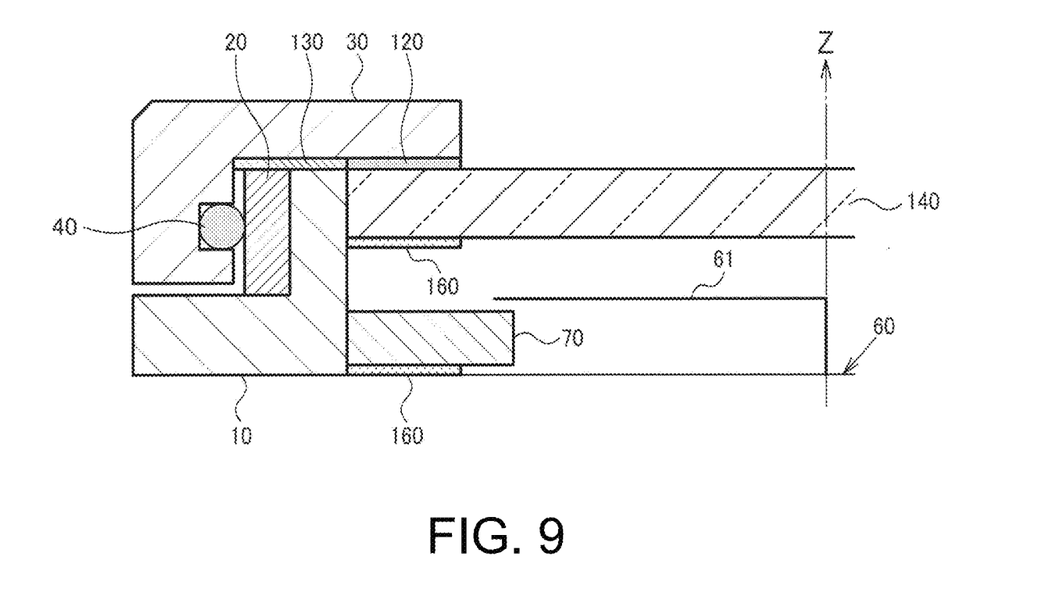
FIG. 9 is another cross-sectional view of the wearable device according to the modification.

FIG. 9 is a cross-sectional view of the electronic device 100 (wearable device 200) according to another modification. As shown in FIG. 9, in the electronic device 100 according to this modification, the display panel 150 may be omitted. The electronic device 100 may include components similar to those of an analog wristwatch, such as a dial 60 where a hand 61 is arranged, and a parting plate 70.

In FIG. 9, as in FIG. 2 and the like, the rotating bezel 30 is arranged in such a way that a part of the rotating bezel 30 (inner circumferential part) overlaps the cover 140, and the touch panel 160 is provided in the area where the rotating bezel 30 and the cover 140 overlap each other. Various positions in the Z-axis direction to provide the touch panel 160 are conceivable. For example, the touch panel 160 may be provided on the back surface (surface on the negative Z-axis direction side) of the cover 140 or may be provided on the back surface of the parting plate 70. In FIG. 9, the touch panel 160 is provided at two positions for the sake of convenience. However, the touch panel 160 may be provided at one of these positions. This configuration makes it possible to realize a useful UI by the touch panel 160 detecting the rotation of the rotating bezel 30, even in the electronic device 100 displaying time or the like on an analog dial instead of digital display.

3.2 Collaboration with External Device

The electronic device 100 may include a communication unit (not illustrated) which communicates with an external device. The communication unit is connected to an external device, for example, via short-range wireless communication. The short-range wireless communication in this case can employ various formats such as Bluetooth (trademark registered), NFC (near field radio communication), and ANT+. The processing circuit transmits the result of detecting the rotation (absolute position, amount of rotation) of the rotating bezel 30 to the external device via the communication unit.

This configuration enables the external device to use the result of operation on the rotating bezel 30 of the electronic device 100. The external device is, for example, a mobile terminal device such as a mobile phone (smartphone). Various specific ways of using the result of detection are conceivable. For example, the notification unit of the electronic device 100 notifies the user of the arrival of a call or email to the mobile phone via the communication unit. In response to the notification, the user operates the rotating bezel 30. The processing circuit detects the operation on the rotating bezel 30 and transmits the result of the detection to the mobile phone. The mobile phone carries out processing (starts phone conversation, displays details of the email, or the like) according to the result of the detection. Alternatively, the user may execute an operation (fast forward or the like) in an audio application on the mobile phone, using the rotating bezel 30 of the electronic device 100. In this case, the user can use the rotating bezel 30 like adjustment knob on an audio device.

3.3 Modification of Movable Part

In the example described above, the movable part 110 is the rotating bezel 30. However, other structures than the rotating bezel 30 can be used as the movable part 110.

Figure 10:
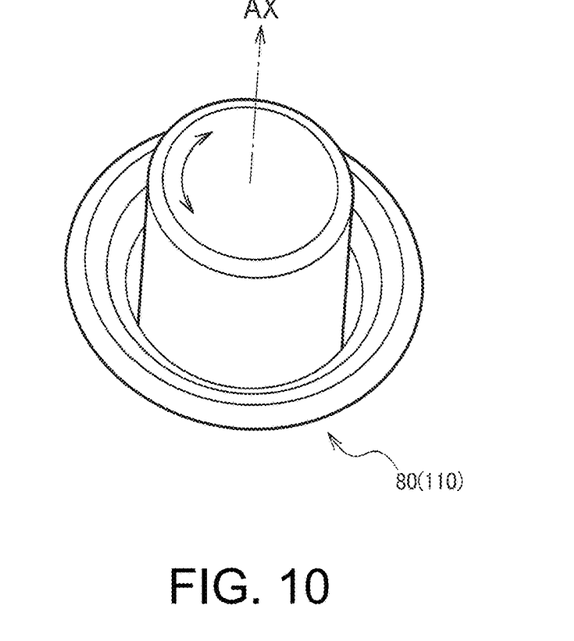
FIG. 10 is a perspective view of a jog dial as a movable part.

FIG. 10 shows an example where a rotating body (jog dial 80), which is different from the rotating bezel 30, is used as the movable part 110. In the example of FIG. 10, the jog dial 80 as the movable part 110 is a cylindrical member configured to be rotatable about AX as its center axis of rotation. That is, the rotating body as the movable part 110 is not limited to the bezel provided on the peripheral edge part of the device. Various forms of rotating bodies can be used.

Figure 11:
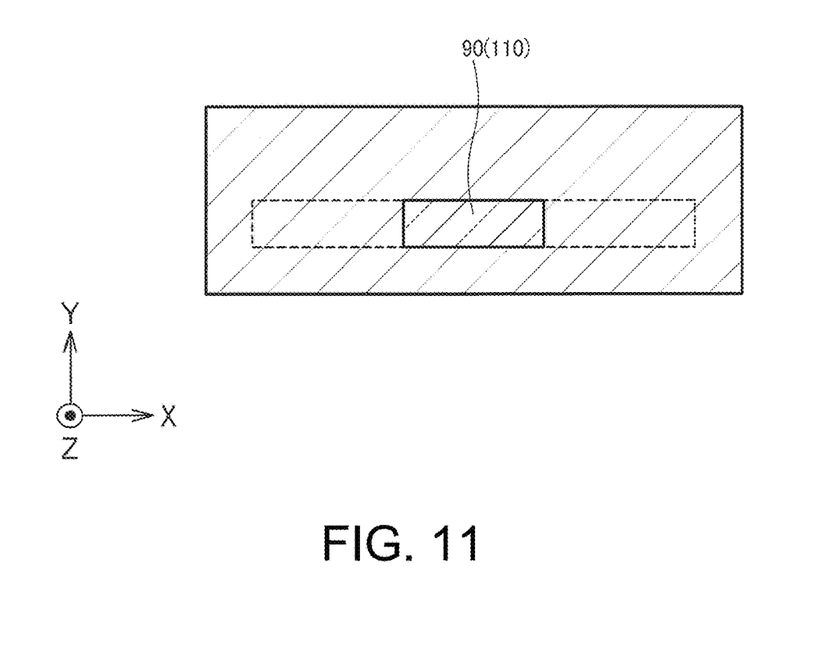
FIG. 11 is a plan view of a slide part as a movable part.
Figure 12:
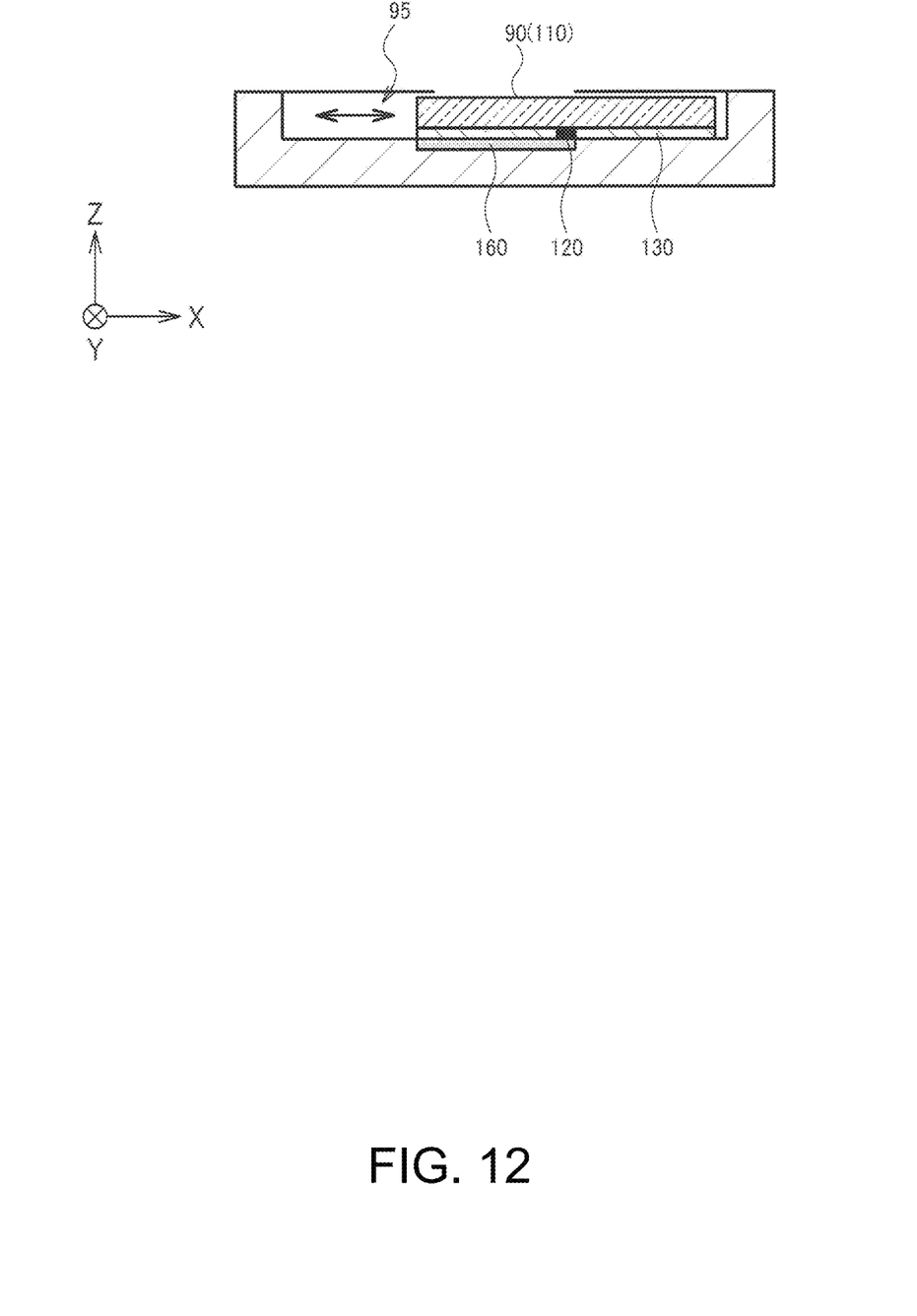
FIG. 12 is a cross-sectional view of the slide part as a movable part.

FIGS. 11 and 12 show an example where a slide part 90, which is not a rotating body, is used as the movable part 110. FIG. 11 is a plan view of the peripheries of the slide part 90. FIG. 12 is a cross-sectional view of the peripheries of the slide part 90. The axes X, Y, Z in FIGS. 11 and 12 are set for the sake of convenience of the description and need not coincide with the respective axes in FIGS. 1 to 3 or the like.

As shown in FIGS. 11 and 12, the slide part 90 is formed by a rectangular parallelepiped member where the X-axis is its longitudinal direction. The electrical conductor 120 is bonded to the bottom surface side (negative Z-axis direction side) of the slide part 90. The touch panel 160 is provided on the negative Z-axis direction side of the electrical conductor 120.

The electronic device 100 is provided with an accommodation part 95 for the slide part 90. The length in the X-axis direction of the accommodation part 95 is longer than the length of the long side of the slide part 90. This enables the slide part 90 to make a translation movement in the X-axis direction. With the translation movement of the slide part 90, the electrical conductor 120 makes a translational movement in the X-axis direction in the area overlapping the touch panel 160 as viewed in the plan view.

With the technique shown in FIGS. 11 and 12, too, the movable part 110 is configured to provide physical feedback and the electrical conductor 120 instead of a finger touches the touch area. That is, as in the example where the rotating bezel 30 is used, an UI which has high detection accuracy and can be properly used even in a harsh environment can be realized.

The embodiments of the invention and modifications thereof have been described above. However, the invention is not limited to each of the embodiments and the modifications thereof and can be embodied with components modified without departing from the spirit and scope of the invention. It is possible to form various inventions by properly combining a plurality of components disclosed in the embodiments and modifications. For example, some components may be eliminated from all the components described in the embodiments and modifications. Components described in different embodiments and modifications may be properly combined together. Also, a term described along with a different term of a broader meaning or the same meaning at least once in the description or drawings can be replaced with that different term at any point in the description or drawings. Thus, various modifications and application can be made without departing from the spirit and scope of the invention.

What is claimed is:

1. A wearable device comprising:
    an electrostatic capacitance-type touch panel; a movable part which is electrical conductive and overlaps the touch panel as viewed in a plan view from a direction intersecting the touch panel; and an electrical conductor which overlaps the movable part as viewed in the plan view and moves with a movement of the movable part, wherein at least a part of the electrical conductor moves, overlapping the touch panel, as viewed in the plan view, and the movable part and the electrical conductor are electrically continuous to each other;

wherein an insulator is provided between the movable part and the touch panel and wherein a penetration part penetrating the insulator from a surface on the movable part side to a surface on the touch panel side is provided, and the electrical conductor is provided in the penetration part.

2. The wearable device according to claim 1, wherein the movable part overlaps the touch panel as viewed in the plan view and rotates about a predetermined axis as an axis of rotation.

3. The wearable device according to claim 1, further comprising:
 a casing which accommodates the touch panel;
 a holding member provided between the casing and the movable part; and
 an elastic member provided between the holding member and the movable part,
 wherein when a direction opposite to the direction as viewed in the plan view is defined as a first direction, a surface on which the holding member and the movable part come in contact with each other is a surface sloped in a direction of moving away from the first direction as it goes in the first direction.

4. The wearable device according to claim 1, further comprising a display panel,
 wherein the touch panel overlaps the display panel as viewed in the plan view.

5. The wearable device according to claim 1, further comprising a display panel,
 wherein the touch panel is provided in an area where the display panel and the movable part overlap each other as viewed in the plan view.

6. The wearable device according to claim 1, further comprising a processing circuit which detects a position where the touch panel and the electrical conductor come in contact with each other.

7. The wearable device according to claim 1, further comprising a notification unit which gives a user a notification, using at least one of sound, vibration, and light,
 wherein the notification unit gives the notification if it is detected that the electrical conductor is situated at a predetermined position.

* * * * *